United States Patent [19]
Albeck et al.

[11] Patent Number: 4,909,379
[45] Date of Patent: Mar. 20, 1990

[54] VIBRATOR CONVEYOR SYSTEM

[75] Inventors: Bernhard Albeck, Waiblingen-Neustadt; Klaus Albrecht, Schornodorf, both of Fed. Rep. of Germany

[73] Assignee: Schwabe GmbH, Urbach, Fed. Rep. of Germany

[21] Appl. No.: 183,727

[22] Filed: Apr. 20, 1988

[30] Foreign Application Priority Data

Apr. 25, 1987 [DE] Fed. Rep. of Germany ....... 3713980

[51] Int. Cl.$^4$ .............................................. B65G 27/24
[52] U.S. Cl. .................................... 198/769; 198/757; 198/763; 310/23; 310/36
[58] Field of Search ...................... 310/23, 24, 30, 36, 310/38; 198/750, 752, 756, 757, 759, 763, 766, 769

[56] References Cited

U.S. PATENT DOCUMENTS

| | | | |
|---|---|---|---|
| 2,535,050 | 12/1950 | Devol ................................... | 198/757 |
| 3,048,260 | 8/1962 | Willis ................................... | 198/757 |
| 3,315,793 | 4/1967 | Yakubovich .................... | 198/769 X |
| 3,473,759 | 10/1969 | Spiess ................................... | 198/757 |
| 3,575,620 | 4/1971 | Braden . | |
| 3,700,094 | 10/1972 | Parr ................................... | 198/757 |
| 4,181,216 | 1/1980 | Cipu ................................... | 198/757 |

FOREIGN PATENT DOCUMENTS

| | | |
|---|---|---|
| 909004 | 8/1953 | Fed. Rep. of Germany . |
| 974963 | 1/1954 | Fed. Rep. of Germany . |
| 1255815 | 12/1967 | Fed. Rep. of Germany . |
| 1274971 | 8/1968 | Fed. Rep. of Germany . |
| 2051573 | 5/1971 | Fed. Rep. of Germany . |
| 2313093 | 10/1974 | Fed. Rep. of Germany . |
| 3305998 | 8/1984 | Fed. Rep. of Germany . |
| 0220944 | 4/1985 | German Democratic Rep. ..................................... 198/757 |
| 0075717 | 4/1986 | Japan ................................. 198/769 |
| 0201709 | 9/1987 | Japan ................................. 198/757 |
| 0480248 | 12/1969 | Switzerland ........................ 198/757 |

Primary Examiner—Frank E. Werner
Assistant Examiner—Lyle Kimms
Attorney, Agent, or Firm—Frishauf, Holtz, Goodman & Woodward

[57] ABSTRACT

A vibrator conveyor system, for example in the form of a circular or linear conveyor, has a reciprocating plate adapted for carrying a container, and electromagnetic oscillating armature motors for moving said plate along a primary advancement direction or vector; each motor has a stationary stator, an armature secured to the reciprocating plate, and an excitation coil driven by alternating current or pulsating direct current, the coil being disposed on a pole piece the stator, the pile piece having a stator pole surface cooperating with an armature pole surface. The reciprocating plate is elastically supported by spring elements in a manner limiting its vertical and horizontal motion. The elongated spring elements are aligned along at least a portion of the rim of the plate with equal inclination with respect to a plane containing the conveyor advancement vector, and are fastened to the plate. The armature and stator of at least two oscillating armature motors are each laminated of dynamo lamellae into a laminated packet and are disposed in the space enclosed by the spring elements with stator pole surfaces disposed in parallel planes.

35 Claims, 19 Drawing Sheets

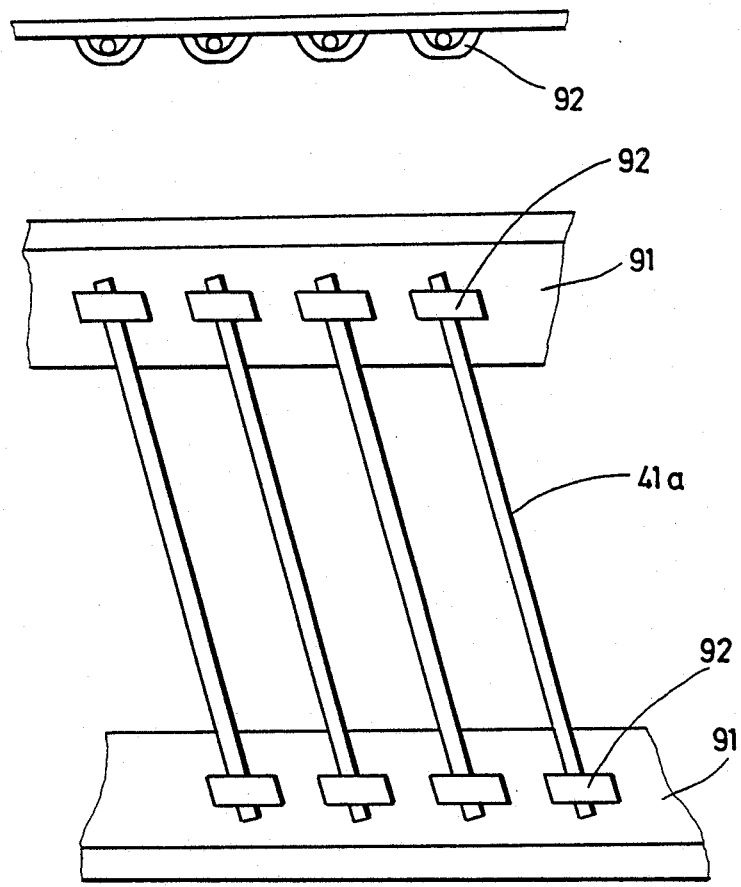

VIBRATOR CONVEYOR SYSTEM

The invention relates to a vibrator conveyor system, formed as a circular or linear conveyor, having a reciprocating plate adapted to receive a container or the like. The system includes electromagnetic drive means, in the form of oscillating armature motors, which impart an oscillating motion to the reciprocating plate and have a stationary stator, an armature secured to the reciprocating plate, and an excitation coil driven by alternating current or pulsating direct current from a current source. The excitation coil is mounted on a stator pole piece having a stator pole surface cooperating with an armature pole surface. The apparatus also includes spring elements, elastically supporting the reciprocating plate such that it is movable to a horizontally and vertically defined extent, and an inertial mass associated with the stator.

BACKGROUND

Vibrator conveyor system of this type is known in several versions from U.S. Pat. No. 3,048,260, Willis. The means for the reciprocating or oscillating plate include a number of oscillating armature motors, which in common with laminated spring packets individually associated with each oscillating armature motor are combined into drive units. Each of these drive units has an approximately rectangular base plate having the stator, and an auxiliary reciprocating plate having the armature screwed onto it, and braced against the base plate via the laminated spring packets. With their base plates and auxiliary reciprocating plates, the component units are each secured by means of central fastening bolts to a common base frame or to the common reciprocating plate of the vibrator conveyor system. For greater stability, especially when the system is formed as a circular conveyor, the base frame is a cast part having an additional inertial mass.

Since the elongated spring elements on the individual drive units have a predetermined, fixed three-dimensional orientation with respect to their pole surfaces, the result, particularly in the case of a circular conveyor, is a complicated arrangement, with skewed transverse axes of the units on the base frame and the common reciprocating plate. To avoid unfavorable vibration and hence so-called dead zones on the common reciprocating plate, the individual units must be adjusted exactly in terms of their three-dimensional position following installation, which is complicated and labor-intensive. Because of the fundamentally unfavorable drive relationships of the common reciprocating plate, such a vibrator conveyor system also has limited efficiency.

A more favorable arrangement of the spring elements is found in a drive assembly known from German Patent Disclosure Document DE-OS No. 20 51 573, intended for generating simultaneous up-and-down and rotational movements, in particular for screw conveyors, having two parts movable relative to one another; these two parts and the connecting elements forming the spring elements of these parts are combined into a plastic body. This plastic body is substantially cup-shaped with a perforated cup wall, the annular rim of which is formed by one of the two parts, the perforated cup wall by the connecting or spring elements, and the cup bottom by the other of the two parts. Aside from the fact that the one-piece plastic body must be made from costly and complicated molds, the spring forces that can be generated in this way are limited because of the elastic properties of the plastics available. Also, the plastic body must be accommodated in a cup-shaped sheath connected with the chassis. A single coaxial oscillating armature motor is used as the drive, housed in the plastic body and exerting a force coaxial to the axis of rotation upon the armature connected to the flat part of the plastic body. It is impossible to embody a linear conveyor system in this way.

THE INVENTION

It is the object of the invention to devise a vibrator conveyor system that is simple in design and can be manufactured at favorable cost, and is distinguished by great efficiency and ease of adjustment and installation, whether embodied as a circular or as a linear conveyor system.

Briefly, the vibrator conveyor system of the type described above includes elongated spring elements aligned along a portion of the reciprocating or oscillating plate rim, inclined equally relative to a plane containing the conveyor advancement vector, and fastened to the reciprocating plate. The armature and stator of at least two of the oscillating armature motors are each laminated structures of dynamo lamellae assembled into a laminated packet, and located in a space surrounded by the spring elements. The stator pole surfaces are disposed in parallel planes.

The separate spring elements, secured to the reciprocating plate and closely distributed along the rim thereof, assure a simple construction in which the spring elements can be adapted in number and form to the particular and intended use. The at least two oscillating armature motors, which have the same structure, are accommodated in a space-saving manner and permit optimal drive of the reciprocating plate while avoiding dead zones. Since the stator and armature each comprise layered laminated packets, only very slight losses occur; manufacture is simple and operating efficiency is high. Because the pole surfaces are spatially identically aligned, it is also easy to adjust the apparatus.

The stator pole surfaces may extend at right angles to the reciprocating plate, or may form an angle of less than 90° with it. Especially in vibrator conveyor systems of relatively low power, the arrangement can advantageously be such that the stator and/or armature of at least two oscillating armature motors is each embodied by a laminated stator or armature packet, respectively, common to said oscillating armature motors.

Alternatively, a separate arrangement of the individual stator and/or armature laminated packets on a common carrier, such as a base plate or the reciprocating plate, is intrinsically possible as well. The pole pieces can also be integrally formed by cutting away part of the associated respective laminated stator packet, which further simplifies manufacture. Depending on the stamped pattern of the sheets, however, and for instance to avoid waste from the stamping operation, it may also be conceivable to embody the pole pieces of separately stamped-out sheets and then to secure the layered pole pieces as individual parts to the stator lamination packet.

It has proved advantageous for the laminated stator packet to have at least one opening defined on one side, at least in part, by at least one stator pole surface, with an armature aligned with its pole surface aimed at the stator pole surface protruding into the opening and being limitedly movable in it with play. In this way, the inertial mass necessary for the stability of the vibrator conveyor system and provided by the laminated stator packet is increased by simple means. The result is very simple conditions in terms of accommodating and arranging the excitation coil, if the pole piece having the respective stator pole surface and adjoining the opening is defined on two opposed sides by two slits leading into the opening and in which the spool sides of the excitation coil are received. Additionally, the pole piece can have a lesser height than the laminated stator packet, and indentations receiving the winding heads of the excitation coil are formed between the pole piece and the associated long sides of the laminated stator packet, the indentations advantageously having a depth corresponding at least to the height of one winding head. In this embodiment of the laminated stator packet, the excitation coil is completely accommodated in the laminated stator packet, which once the excitation coil is mounted can be impregnated in the usual manner, so that the excitation coil is fixed positionally firmly by the impregnating material and potted with it. Since the excitation coil does not protrude beyond the laminated packet instead is received entirely within it, no particular precautions need to be taken to install the prefabricated stator part.

To make installation easier, it is also suitable for the opening in the extension of the pole piece to have has an inside width exceeding the axial length of the excitation coil, such that the excitation coil can be introduced into the opening and slipped from it onto the pole piece.

The opening and the associated armature can have a substantially rectangular cross-sectional shape, which assures very simple conditions in terms of the stamping tool and assures that the dynamo lamellae will be efficiently used, with low waste. Especially in lower-output circular conveyors, the central opening may have a substantially star-shaped form having arm-like elements extending from it, the stator pole surfaces being located in the vicinity of the arms and having their centers located preferably on a common circle coaxial with the axis of reciprocation. This embodiment produces a very uniform drive of the reciprocating plate.

It is also advantageous if the armlike elements of the opening are defined on at least one side by flat faces with which the stator pole surfaces are associated.

When the conveyor system is embodied as a high-output circular conveyor, the one-piece or multi-piece laminated stator packet can suitably be substantially annular, and advantageously it is cylindrical, although outer shapes, such as rectangular or polygonal forms, are also possible, depending on the structure and intended use of the vibrator conveyor system.

In many embodiments as either a circular or linear conveyor, it is sufficient if the inertial mass necessary for stability of the vibrator conveyor system is predominantly formed by the laminated stator packets or the common laminated stator packet. Should that not be the case, then the vibrator conveyor system can have an additional inertial mass connected to the laminated stator packets or to the common laminated stator packet. As a result, in the aforementioned circular conveyor system having a substantially annular laminated stator packet, particularly favorable conditions are attained if the inertial mass includes small mass elements, in particular stamping waste from dynamo lamellae, which are made to cohere by a bonding agent. This makes it possible to make use of the unavoidable stamping waste, or other inexpensive particles of material, in particular metal.

In a vibrator conveyor system embodied as a circular conveyor, the reciprocating plate can be supported so that it is radially and axially movable relative to the laminated stator packets or the common laminated stator packet by means of its own bearing arrangement, to provide additional guidance of the reciprocating plate. In many cases, however, the guidance of the reciprocating plate effected by the spring elements disposed on the rim is already sufficient, so that a separate additional bearing or guidance of the reciprocating plate can be dispensed with.

The dynamo lamellae forming the laminated stator packet are stamped out of suitable dynamo metal strips or plates.

In particular in vibrator conveyor systems in which the stator lamination packet has openings receiving the armature, very favorable conditions in terms of stamping waste are attained if the dynamo lamellae of the laminated stator packets or of the common laminated stator packet are stamped out from a sheet-metal strip defined on parallel sides, and the dynamo lamellae of the laminated armature packet are formed from the sheet-metal parts stamped out from the openings. While in circular conveyors in which the cylindrical stator is of small diameter the individual lamellae may still be stamped out in a diamond shape, this would be uneconomical for high-output circular conveyors, because of the unavoidable stamping waste. For such circular conveyors having an annular laminated stator packet, it is preferable to stamp out wedge-shaped recesses in the aforementioned lamellae strip, located between adjacent openings and extending from one side edge, and to curve the sheet-metal strip in the plane of the strip about narrow webs remaining at the bottom of the recesses, forming an annular stator.

The stator can be assembled in layers from individual annular lamellae curved in this way, in such a manner that a lamellae strip of predetermined length forms each annular layer; however it can also be advantageous for the strip to be curved substantially in a spiral, forming individual layers of the laminated stator packet that rest flat on one another.

If the webs existing at the bottom of the triangular recesses are left out or severed during stamping, the laminated stator packets become substantially trapezoidal.

For smaller outputs of a circular conveyor, two trapezoidal laminated stator packets can be provided, with their long sides pointing parallel toward one another, optionally, immediately adjacent one another, while in circular conveyors having an annular stator of large diameter, the trapezoidal laminated stator packets are arranged with their short sides facing one another in parallel are located adjoining one another. Gaps may remain between the short sides; alternatively, the short sides of adjacent laminated stator packets can also abut one another. The same laminated stator packets can also be used for a linear conveyor system. In that case, they are then simply disposed in succession with long sides parallel to one another, and it is suitable if successive trapezoidal laminated stator packets are each rotated by 180° relative to one another, so that their short sides are aligned directly parallel to one another. An arrangement of the laminated stator packets of this kind, rotated by 180°, is also advantageous in the aforementioned circular conveyor, in which only two trapezoidal laminated stator packets are disposed with their long sides adjacent one another.

It has proved to be particularly advantageous for the spring elements to be embodied by elongated bent spring wire elements, secured at one end on the reciprocating plate, and at the other end on the laminated stator packets or on the common laminated stator packet. These spring wire elements are substantially rigid in the longitudinal direction, while being flexible in the transverse direction; they can also be called spring bars. The profile shape of these spring elements depends on the intended use; they can be circular, polygonal or otherwise suitably selected, including an elongated cross-section, which produces substantially rail- or strip-like spring elements. Each spring wire elements may be a separate individual part, but it is also possible for the spring wire elements to be parts of a generally U-shaped spring wire element that is suitably curved and forms at least two spring wire legs. They may be straight, or in an advantageous embodiment may also be substantially S- or Z-shaped.

How the spring wire elements are secured to the reciprocating plate depends, among other factors, on the special shape of the reciprocating plate and on the resultant conditions of manufacture and insulation. It is simple if the spring wire elements are secured on the reciprocating plate and/or the base plate associated with the laminated stator packets or packet by means of clamping rings. Another option is to secure the spring wire elements on these parts by means of shackle-like fastening means.

Particularly simple and suitable manufacturing and installation conditions arise if the spring elements are formed of narrow spring-elastic webs of a sheet-metal strip having stamped-out recesses defining the webs, the strip being secured on the reciprocating plate, the laminated stator packets or packet, or the base plate. The webs may be wound about their longitudinal axis, in such a manner that they are located over a portion of their length in planes that form a predetermined angle of less than 90° with the plane of the strip. By simple dimensioning of the web width and length as well as the twisting of the webs, any desired spring properties can be generated without requiring additional special provisions therefore. The twisting itself can be produced at the same time as the stamping, using a compound tool.

Exemplary embodiments of the invention are shown in the drawing and described in further detail below.

DRAWING

Figure 1:
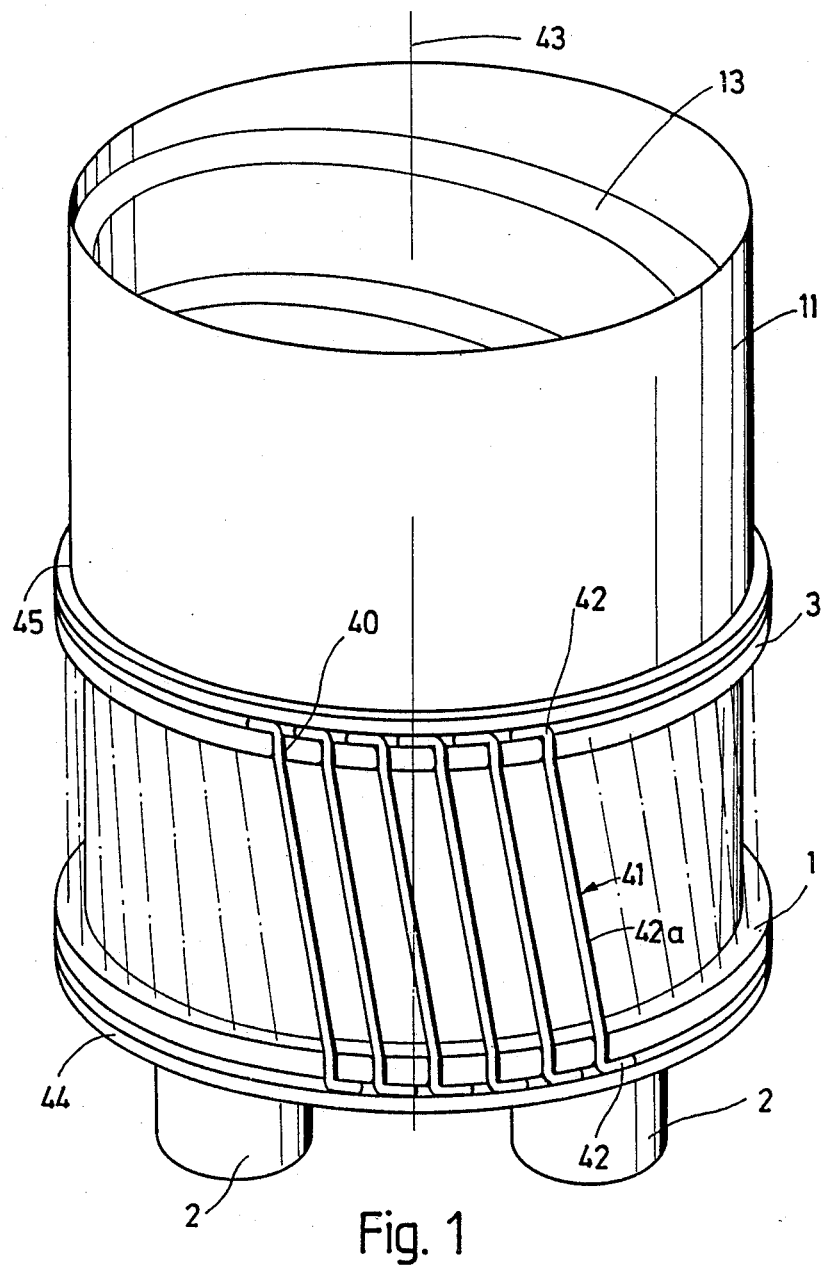
FIG. 1 shows a vibrator conveyor system according to the invention, embodied as a circular conveyor, seen in a schematic perspective view.
Figure 3:
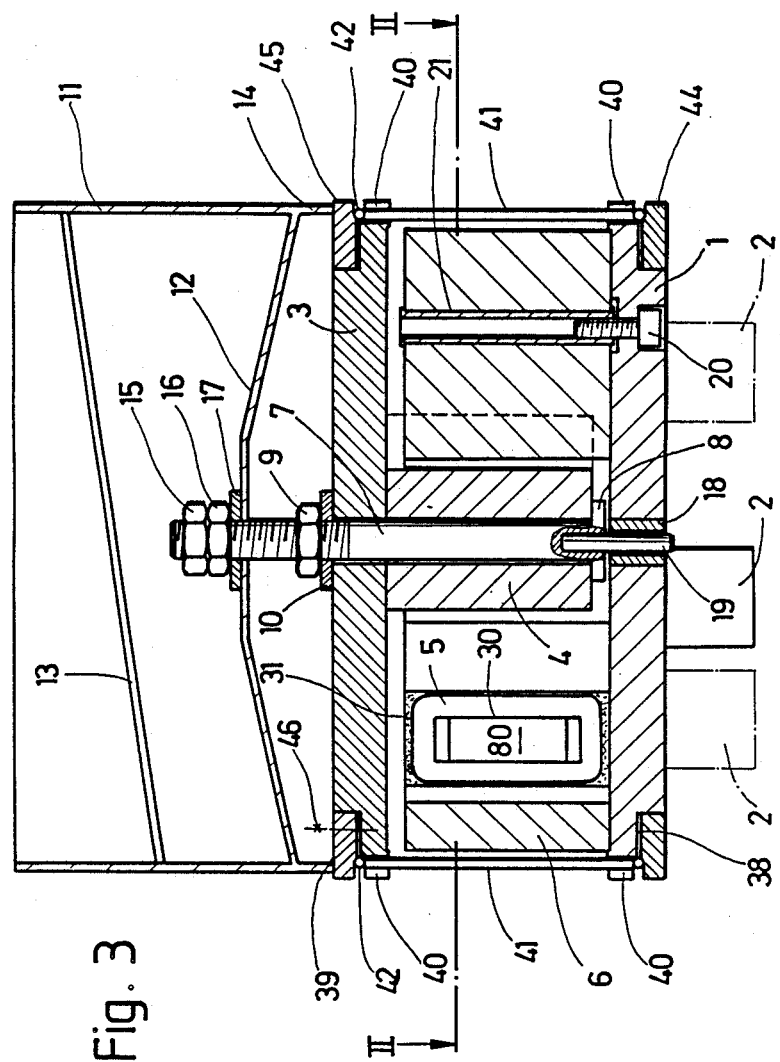
FIG. 3 is a lateral sectional view taken along the line III—III of FIG. 2 of the vibrator conveyor system of FIG. 1.
Figure 4:
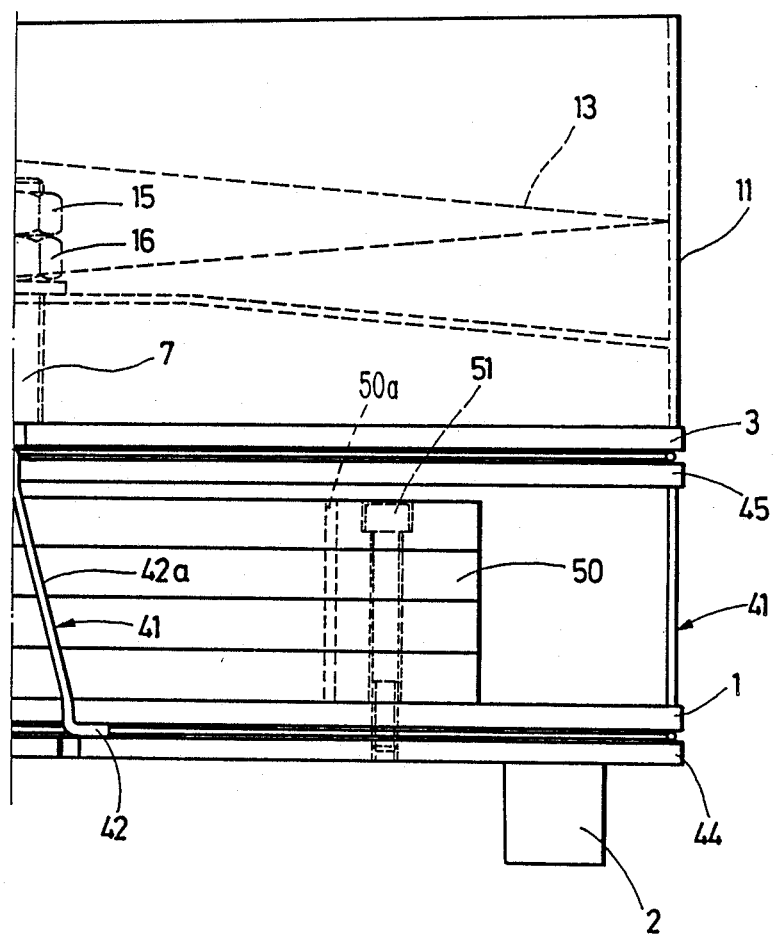
Figure 5:
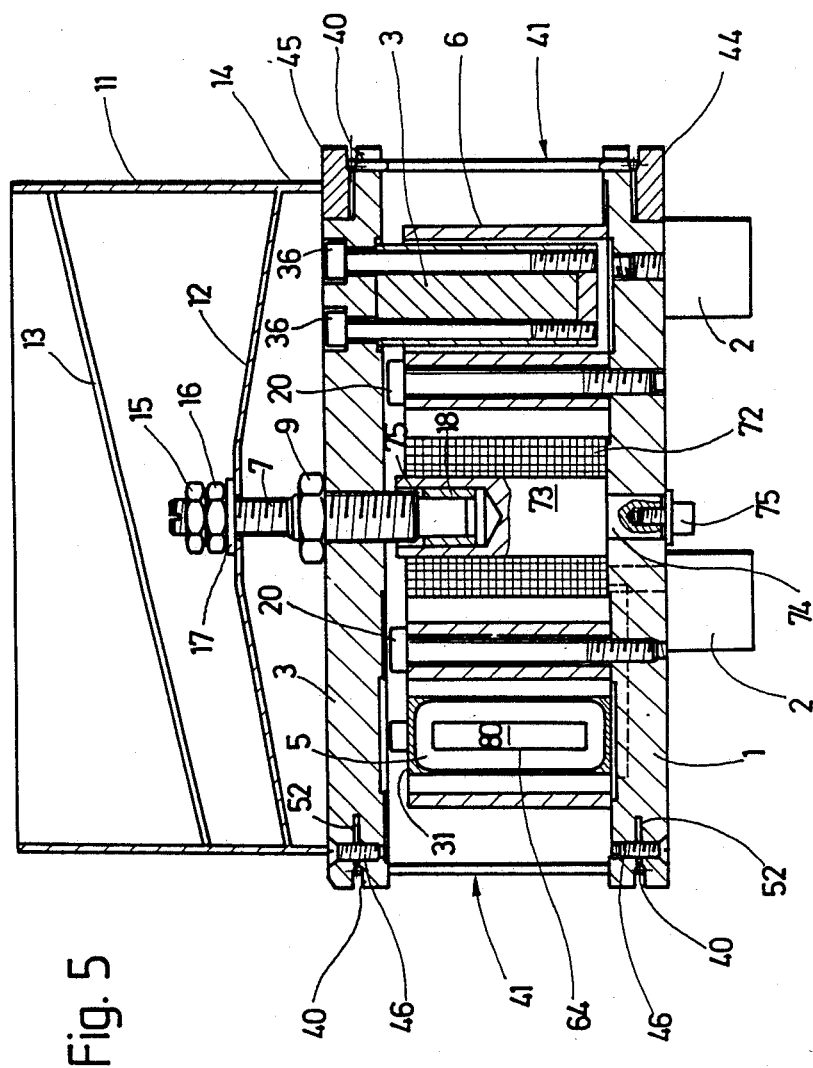
Figure 6:
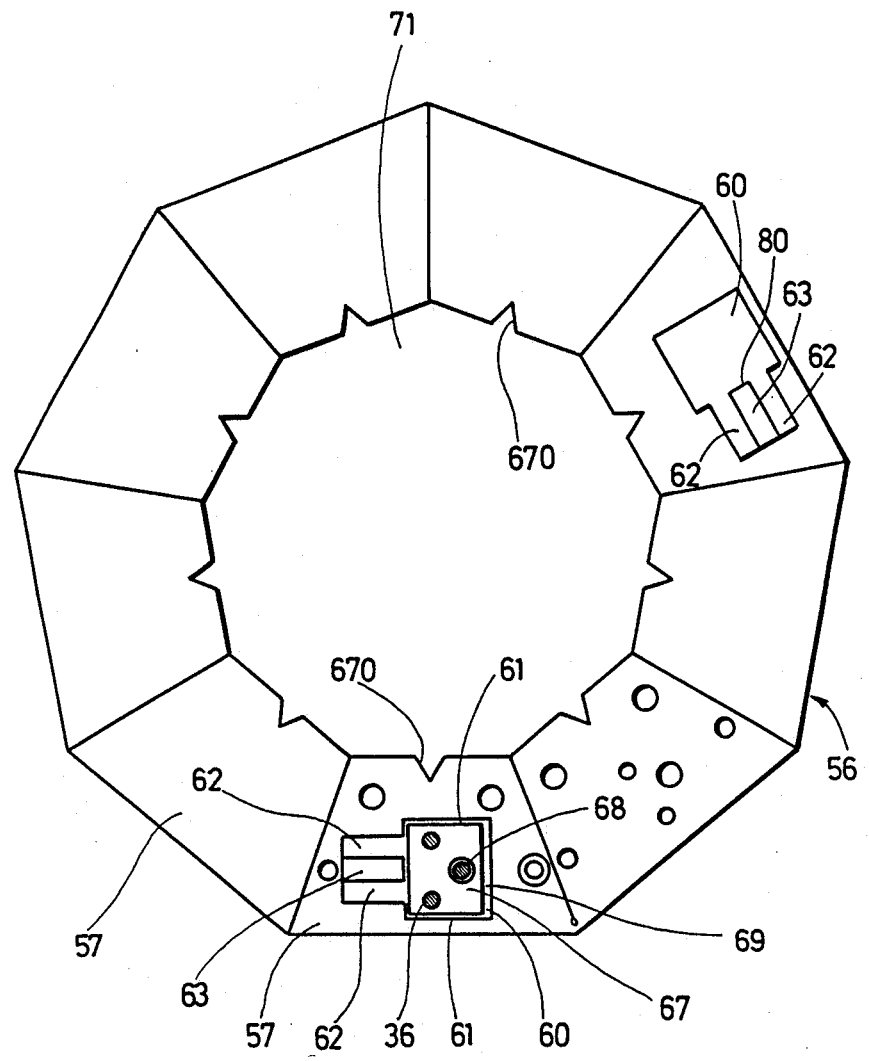
Figure 7:
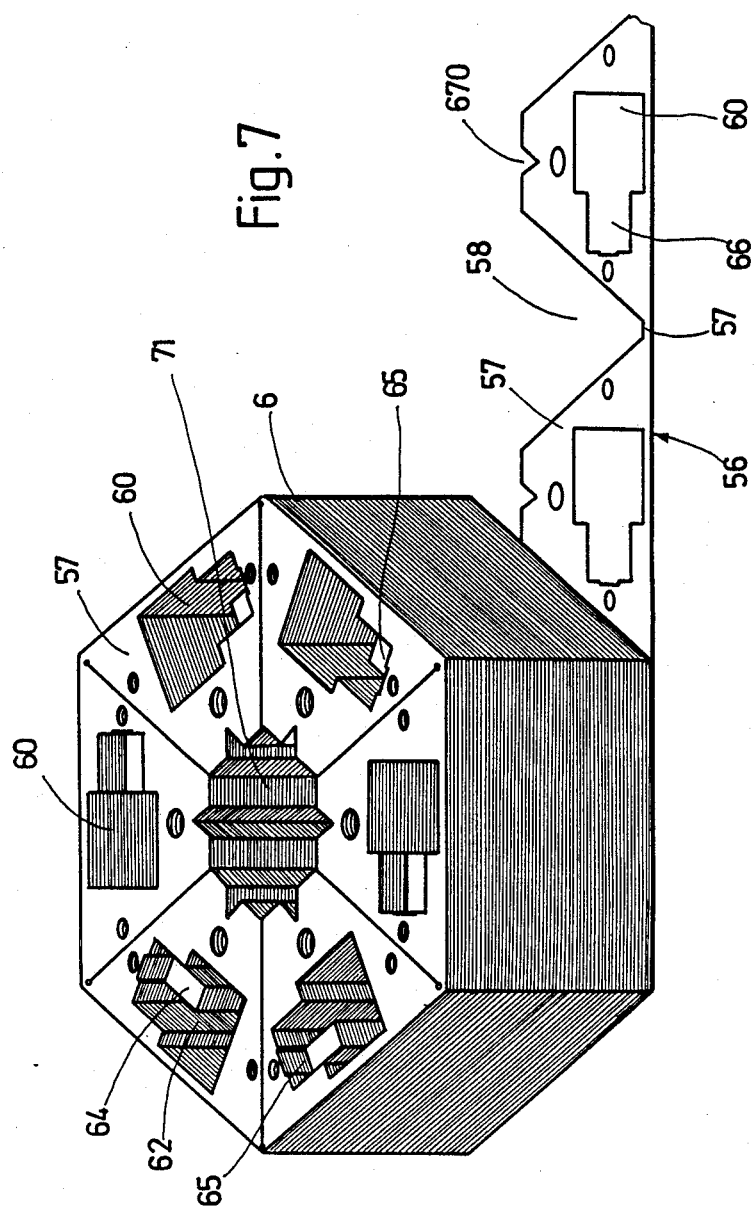
Figure 8:
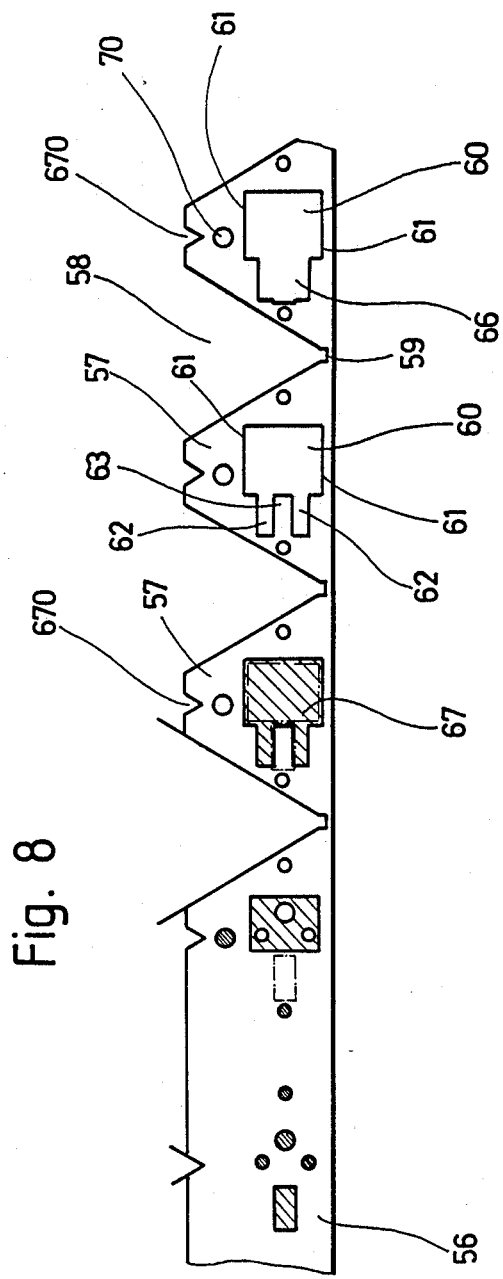
Figure 9:
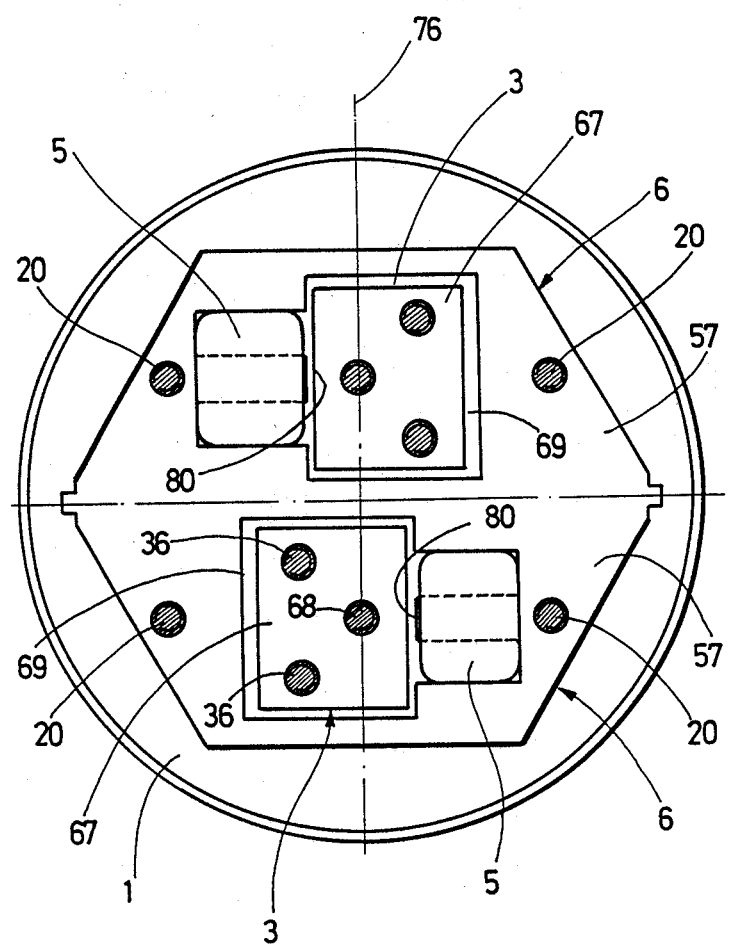
Figure 10:
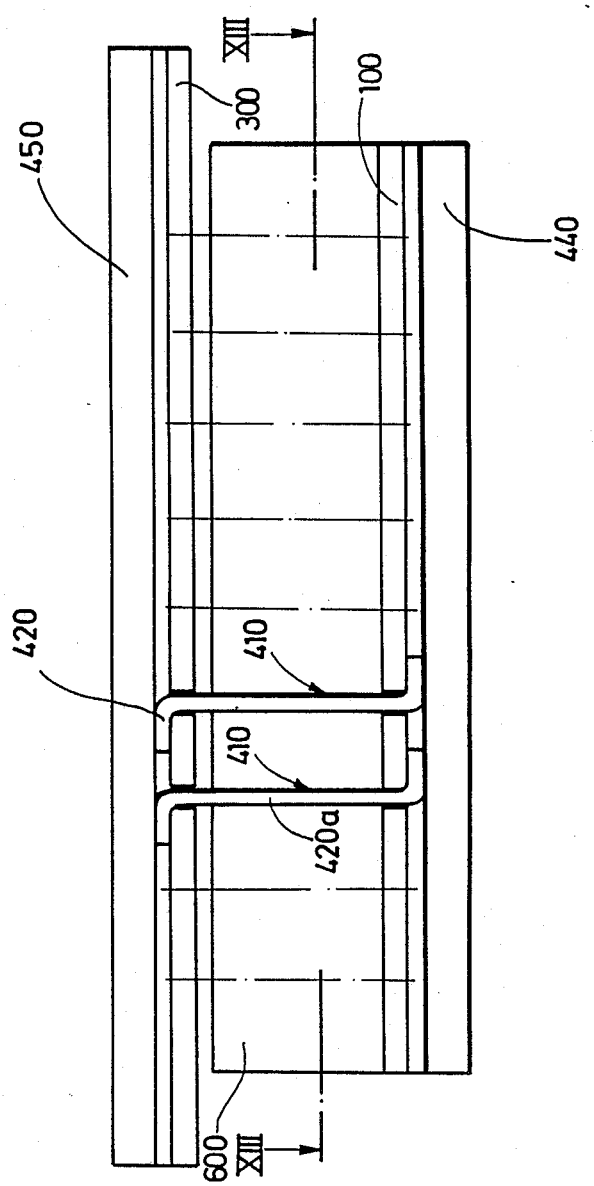
Figure 11:
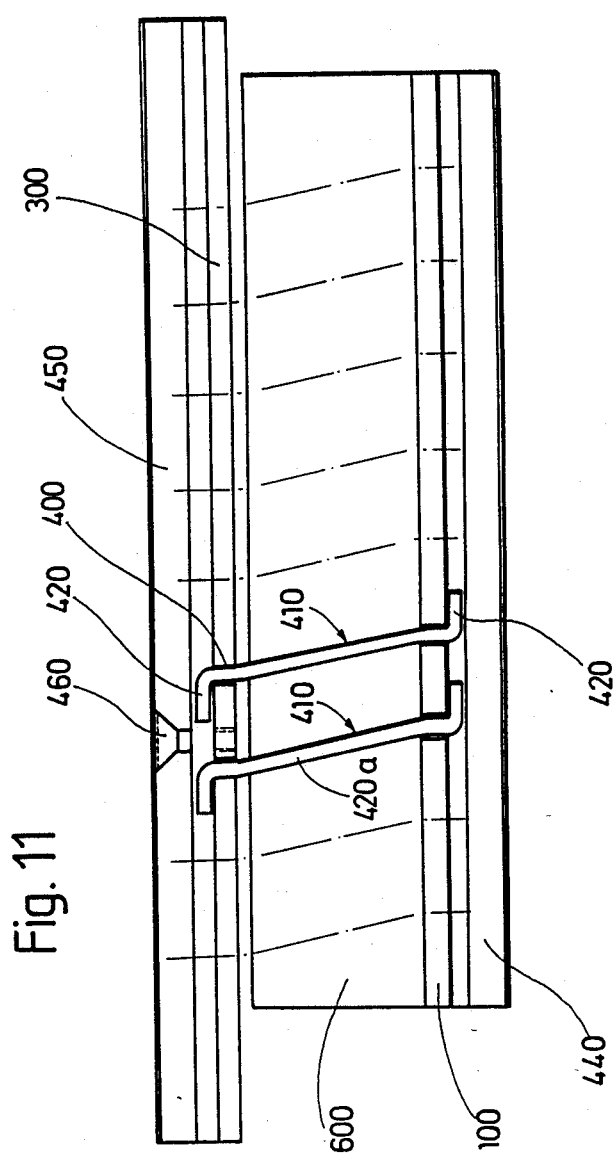
Figure 12:
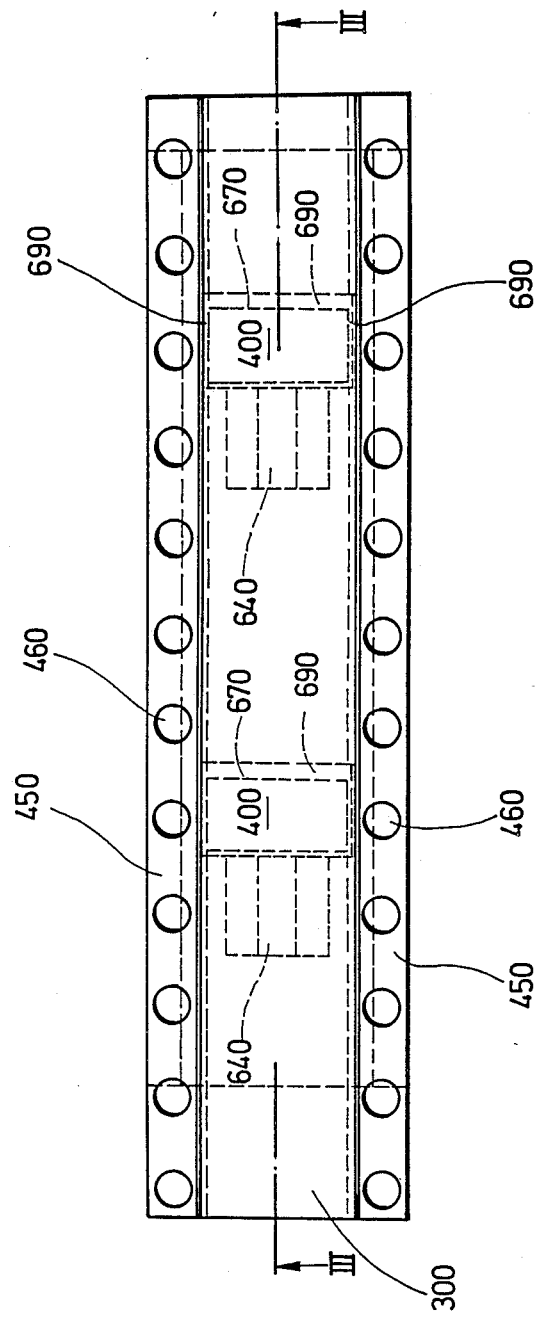
Figure 13:
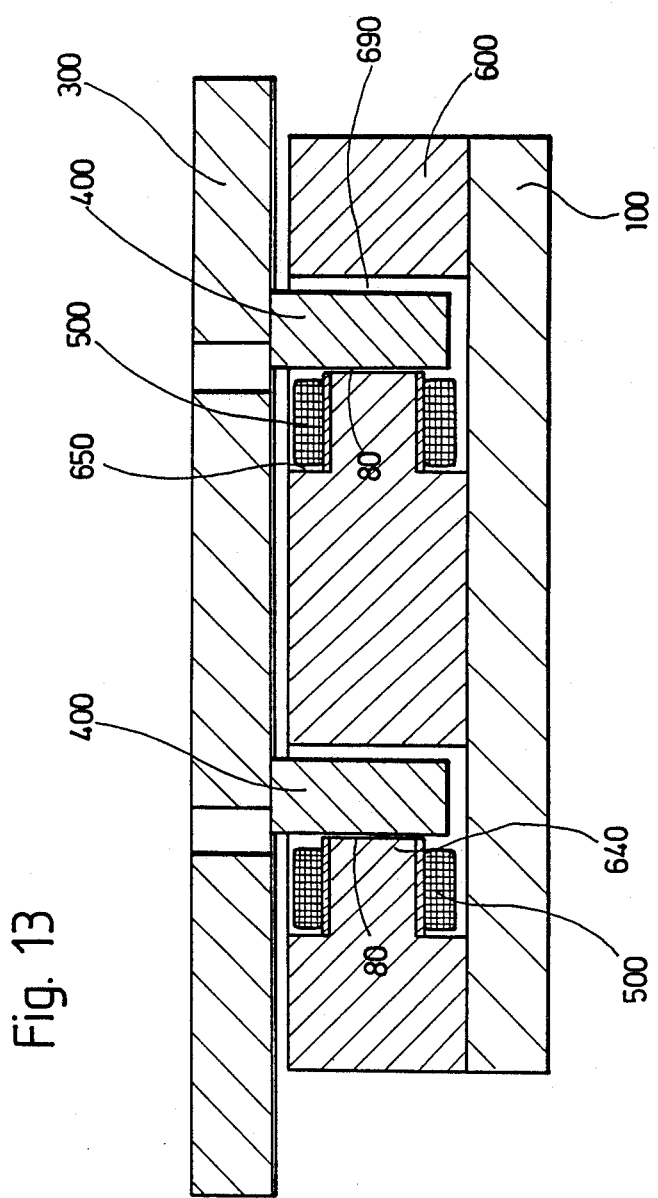
Figure 14:
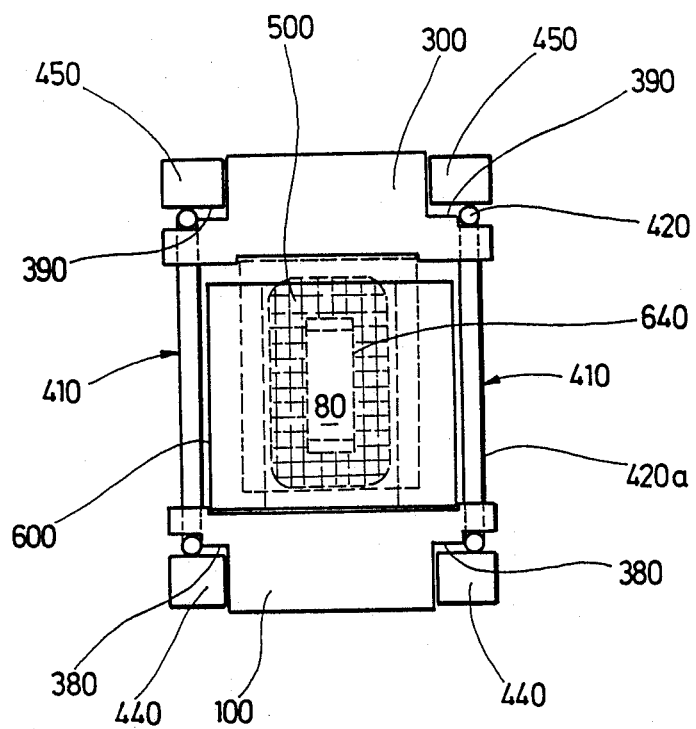
Figure 15:
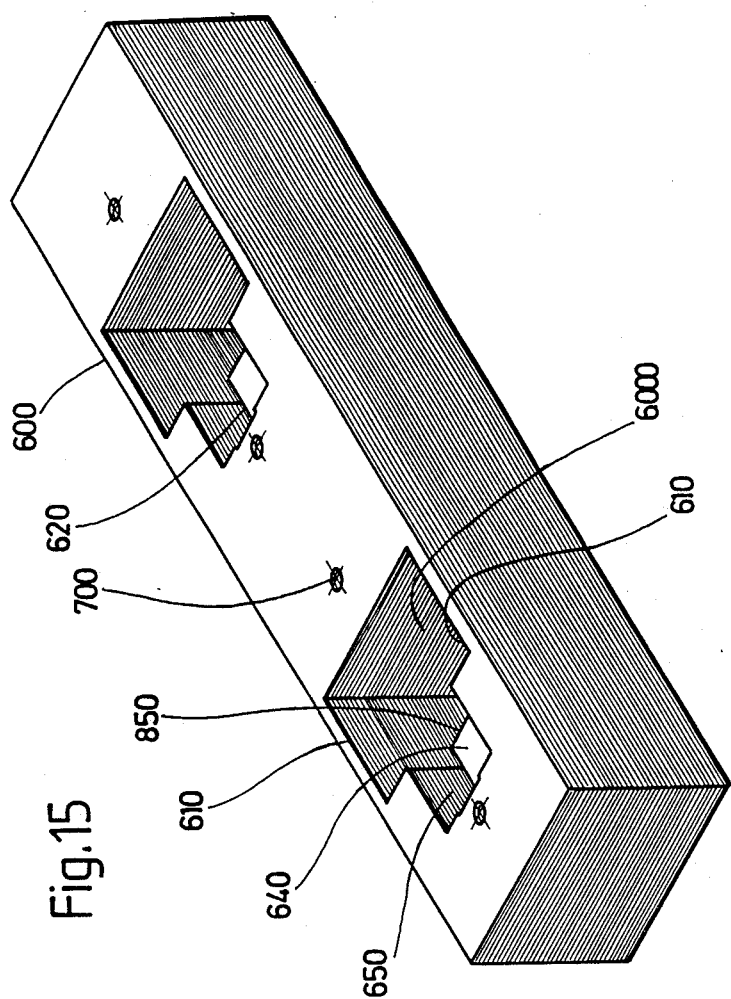
Figure 23:
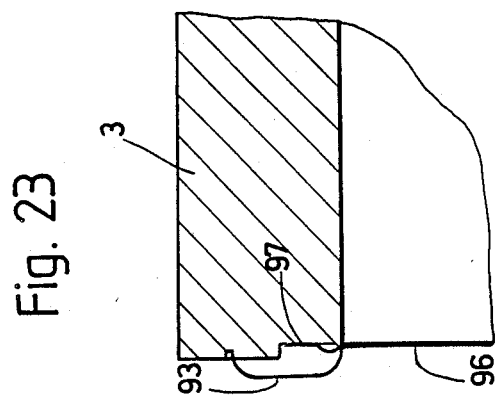

FIG. 4, on a different scale, is a fragmentary side view of a modified embodiment of the vibrator conveyor system of FIG. 1;

FIG. 5 is a sectional view similar to FIG. 3 and on a different scale of a further modified embodiment of the vibrator conveyor system of FIG. 1;

FIG. 6 is a plan view of the stator of the vibrator conveyor system of FIG. 5, without excitation coils;

FIG. 7 is a schematic perspective view of a modified embodiment of the stator of the vibrator conveyor system of FIG. 5;

FIG. 8 shows a dynamo lamellae from which the oscillating armature motor of the circular conveyor of FIG. 5 or 6 is made;

FIG. 9, in a view similar to FIG. 6, shows another embodiment of the drive unit of a vibrator conveyor system according to the invention, embodied as a circular conveyor;

FIG. 10 is a schematic side view of a vibrator conveyor system according to the invention embodied as a linear conveyor showing a threshold position of the reciprocating plate with the excitation coils in the non-excited state;

FIG. 11 is a schematic side view of the vibrator conveyor system of FIG. 10 with the spring elements arranged differently;

FIG. 12 is a plan view of the vibrator conveyor system of FIG. 10;

FIG. 13 is a sectional side view, on a different scale, taken along the line XIII—XIII of FIG. 10 showing the vibrator conveyor system of FIG. 10;

FIG. 14 is a front view of the vibrator conveyor system of FIG. 10;

FIG. 15 is a schematic perspective view of the stator of the vibrator conveyor system of FIG. 10;

FIGS. 16–22 show various embodiments of the spring elements and the fastening devices in the vibrator conveyor system according to the invention, in each case in a schematic side view and in detail; and FIG. 23 is a side sectional view, in detail, of the arrangement of FIG. 19, showing an external sealing means.

DETAILED DESCRIPTION

The vibrator conveyor system shown in FIGS. 1-8, embodied as a circular conveyor, has a circular-cylindrical base plate 1 made of steel or aluminum, with which it is mounted on a support on a plurality of rubber/metal feet or vibration mounts 2 distributed uniformly about the circular circumference. A likewise circular-cylindrical oscillating or reciprocating plate 3, also made of steel or aluminum, for example, is disposed coaxially above the base plate 1. Located between the base plate 1 and the reciprocating plate 3 are electromagnetic drive means having a laminated armature star 4 (FIG. 2) excitation coils 5 and a laminated stator 6. The reciprocating plate 3 is supported on the base plate 1 via a cylindrical shaft 7, on which the reciprocating plate 3 and the armature star 4 are firmly fastened to one another by means of a collar 8, on one end, and a nut 9 and a washer 10, on the other (see FIG. 3).

In certain embodiments of the vibrator conveyor system, the cylindrical shaft 7 can be omitted, or may be embodied such that after installation it can be rotated out of the centering for adjustment purposes, to which end the bearing pin 19, for example, may be formed or arranged eccentrically.

A coaxial circular-cylindrical container 11 is mounted on the reciprocating plate 3, having a substantially frustoconical bottom 12 and guide ribs 13 wound helically upward secured to the inside of its surface. Via its rib-like lower rim 14, the container 11 is supported on the reciprocating plate 3 and screwed with two nuts 15, 16 and a washer 17 in the middle of its bottom to the shaft 7, and by way of these elements firmly braced against the reciprocating plate 3. Large containers, in particular, can also be fastened on the circumference.

A bearing bush 18 is introduced centrally into the base plate 1, and a bearing pin 19 fitted into the shaft 7 is supported in a rotatable and axially movable manner in this bearing bush 18.

The laminated stator 6, embodied as a lamination packet and held together by hollow rivets 21, is screwed firmly to the base plate 1 with cylindrical screws 20. In the embodiment of FIGS. 1-5, it is substantially cylindrical. It comprises suitably stamped-out laminated rounds of dynamo lamellae, which may optionally also be divided up overlappingly into layered sectors. The outside diameter of the stator 6 substantially corresponds to the diameter of the base plate 1 and reciprocating plate 3, with which it is coaxial.

A substantially star-shaped opening 22 having three arms 23 defined by parallel flanks is provided centrally in the laminated stator 6, the arms 23 each being located with one flank 24 on radii 25, forming an angle of 120° with one another, of the circular cylindrical stator 6. The respective other flanks 26 of the arms 23 extend spaced apart from the flanks 24 on imaginary secants of the circular-cylindrical stator 6, one of which is shown at 27. Adjacent the radially outer portion of each of these arms 23, two slots 29 each are formed in the stator 6, extending at right angles from the flanks 24 located on the radius 25. The stator portions between the slots define a stator pole piece 30, formed by straight flanks and having a rectangular cross section located between the slots, its pole surface 80 thus defining one part of the surface of arm 23.

An excitation coil 5, which is fixed on the stator pole piece 30 by means of a potting compound 31 (see FIG. 3), is mounted on each stator pole piece 30. The spacing between the two flanks 24, 26 is selected such that an excitation coil 5 can be introduced in between the flanks 24, 26 and from there slipped onto the stator pole piece 30.

The armature star 4 screwed together with the shaft 7 is also formed by a layered lamination packet; it protrudes into the star-shaped opening 22 and is shaped similarly to it. The arrangement is such that one flat flank 32 of each of the star arms 33 forms one armature pole surface, and in the one threshold position shown in FIG. 2 extends parallel to the flank 24, that is, parallel to and facing it, of the opening 22. The other parallel flank 34 of each arm 33 of the star, with its associated flank 23 of the opening 22, defines a gap 35 of substantially uniform width over the length, which enables the limited rotatability of the armature star 4 with respect to the stator 6.

Figure 2:
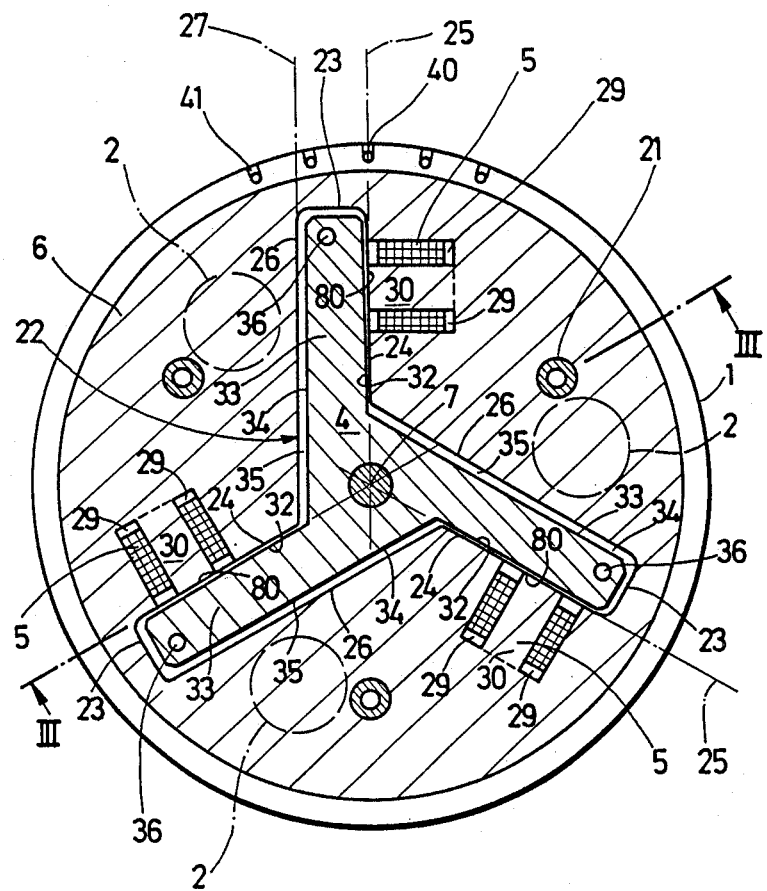
FIG. 2 is a sectional plan view taken along the line II—II of FIG. 3, of the vibrator conveyor system of FIG. 1.

The laminated armature star 4 is screwed on the reciprocating plate 3 on its arms 33 by means of screws 36 (FIG. 2).

In the vicinity of the outer periphery, a lower hollowed-out recess 38 is provided in the base plate 1, and an upper hollowed-out recess 39 is provided in the reciprocating plate 3. Axially parallel, uniformly distributed slots 40 are provided on the periphery of both the base plate 1 and the reciprocating plate 3, opening into the recesses 38, 39. Substantially Z-shaped spring elements 41 are inserted into the slots 40, resiliently bracing the reciprocating plate 3 and the container 11 mounted on it against the base plate 1. The spring elements 41 are bent from cylindrical spring wire and at their ends each have angle portions 42 bent at a right angle (see FIG. 1), connected to one another by means of straight portions 42a that in the position of rest are inclined with respect to the axis of rotation 43. With their lower or upper angle portions 42, the spring elements 41 are inserted into slots 40 that are offset from one another by the distance of one slit slot spacing. They are secured in the structure by being braced against the base plate 1 and the reciprocating plate 3 by means of coaxial clamping rings 44, 45, which are located in the recesses 38, 39 and screwed to the base plate 1 and reciprocating plate 3 by screw bolts 46 (see FIG. 3). Operation In the state of repose, the evenly distributed spring elements 41, with their linear portions 42a, each have a uniform inclination with respect to the reciprocating or oscillating plate 3, the top of which is located in a horizontal plane that includes the primary advancement vector extending in the circumferential direction. The pole pieces 30, along with the armature star arms 33 and the excitation coils 5, form three oscillating armature motors, which have a common stator 6.

The pole surfaces 80 of these three oscillating armature motors are located in parallel planes, which are at right angles to the reciprocating plate 3; they are distributed uniformly.

In operation, the excitation coils 5 are connected to a source of alternating electric current. The induced magnetic field forces the armature star 4 into clockwise rotation, counter to the restoring force of the spring elements 41, to assume the deflected position shown in FIG. 2. Since the spring elements 41, with their linear portions 42a, have the same inclination in the position of repose with respect to the reciprocating plate 3 (FIG. 1), and the container 11 is riqidly connected to the armature star 4 via the shaft 7, the container 11 executes a vertical motion simultaneously with the horizontal rotation; this vertical motion is dictated by the varying obliquity of the linear portions 42a of the spring elements 41 and is made possible by the translational degree of freedom of the bearing pin 19 in the bearing bush 18. Whenever the excitation of the excitation coils 5 becomes zero, the restoring force of the spring elements 41 forces the reciprocating plate 3 and the container 11 rapidly back to the quiescent or repose position. Because of the inertia of the product located in the container 11 and being conveyed, the product is moved radially outward and gradually upward on the conveyor ribs 13.

The fragmentary side view of FIG. 4 shows a modified exemplary embodiment, in which the base plate 1 and the reciprocating plate 3 are diametrically enlarged by comparison with the exemplary embodiment of FIG. 1, so that an annular space still remains for an additional mass 50 between the base plate 1 and the cylindrical stator 6, this mass being firmly screwed to the base plate 1 by cylinder screws 51. The additional mass 50 is formed by circular-cylindrical rings, which surround the stator 6, spaced radially apart therefrom by a small gap 50a.

The circular conveyor shown in FIG. 5 has been modified somewhat from that shown in FIG. 3. Elements remaining the same are identified by the same reference numerals and are not described again here.

The spring elements 41 can be fastened to the base plate 1 and reciprocating plate 3 in various ways. Two possibilities are shown in FIG. 5:

One option is that the base plate 1 and the reciprocating plate 3 are each provided not only with the vertical slits 40, but also with a horizontally stepped clamping slit 52, encompassing the entire circumference and in which the spring elements 41 are firmly fastened (see FIG. 5, left) with their angle portions 42 by means of countersunk screws 46 which pull wall portions defining the clamping slit 52 axially toward one another; a second option is that the spring elements 41 are fastened as shown in FIG. 3 using clamping rings 44, 45 and screw bolts 46 (see FIG. 5, right).

In a manner suitable for manufacture of relatively large circular conveyors, in order to avoid uneconomically great amounts of stamping waste, the common stator 6 is also designed as shown in FIGS. 5-7, having a polygonal cross section; in FIG. 6, it is embodied as a nonagon and in FIG. 7 as a hexagon. Other polygons are equally possible.

The stator 6 comprises dynamo lamellae 56 shown in FIG. 8, wound either in spiral or helical form or stacked in layers, in which substantially trapezoidal stator lamination elements 57 are defined by wedge-shaped or triangular recesses 58 beginning at one edge; these trapezoidal elements are connected to one another in the vicinity of the edge opposite the recesses 58 by small webs 59 forming rated breaking points. Each of the trapezoidal stator lamination elements 57 is provided with a rectangular opening 60, which has two opposed edge 61 oriented parallel to the edges of the dynamo lamellae 56.

Beginning at the left side of each opening 60 (FIGS. 6, 8), two likewise rectangular slits 62 extend at a right angle, each being spaced apart by the same distance from the upper and lower edge 61, respectively, of the opening 60 and between them defining an elongated tongue 63, which in the layered state forms part of a stator pole piece 64 formed by cutting away part of the packet. The stamped-out dynamo lamellae 56 is bent at its webs 59 in the plane of the lamella such that the two sides of equal length of the recesses 58 come to rest directly on one another. By the selection of the angle that a triangular recess 58 forms, on the one hand, and the spacing intervals of the successive recesses 58 each located between two openings 60, on the other, the diameter of the annular common stator 6 is fixed, with a constant width of the dynamo lamella 56.

Alternatively, the laminated stator packets, layered from individual stator lamellae 57, of the individual oscillating armature motors can be disposed, separately on the base plate 1, optionally spaced apart from one another, with their center points located on an imaginary circle. This makes it easy to vary the diameter of the drive means and the number of oscillating armature motors used.

In the segments of the dynamo lamella 56 forming a number of upper and lower layers of the stator 6 (see FIG. 8), the tongues 63 are cut away, thus stamping out rectangular recesses 66. As shown in FIG. 7, this makes indentations above and below the stator pole pieces 64 in the layered stator 6, the indentations receiving the winding heads of the excitation coil 5 slipped onto the respective stator pole piece 64 (see FIG. 5).

The excitation coil 5 is fixed with plastic material or potting compound 31 on the stator pole piece 64. The excitation coil 5, the stator pole piece 64 and the opening 60 are dimensioned such that the excitation coil 5 can be introduced into the opening 60 and slipped onto the stator pole piece 64, with the sides of the coil received in the slits 62, without protruding out of the stator 6.

On the peripheral side opposite the webs 59, the dynamo lamella 56 is provided at regular intervals with triangular notches 670 open at the periphery, which are located approximately in the transverse axis of symmetry of the associated stator lamination element 57 and serve to receive a slaving tool when the dynamo lamella 56 is automatically wound to make the laminated stator packet.

In this case, each armature 4 comprises substantially rectangular armature lamination elements 67, which are layered to form separate, block-shaped laminated armature packets. These laminated armature packets are secured on the reciprocating plate in a positionally correct manner with respect to the openings 60 by means of the screwed 36 and set pins 68, which extend through stamped-out holes in the armature lamination elements 67.

In the assembled state, the armatures 4 protrude with play into the associated openings 60 of the common stator 6. Since the dimensions of the armature lamination elements 67 about the air gap 69 (see FIG. 6) are smaller than those of the opening 60, they are produced directly from the pieces of lamella stamped out from the opening 60, as indicated in FIG. 8 by dashed lines. This makes it possible to stamp out both the stator and armature lamination elements 57, 67, from the same dynamo lamella 56 with a minimum of stamping waste, using a follow-on tool. Holes 70 are additionally made in the dynamo lamella 56 for receiving cylindrical screws 20, which hold the stator 6 together and enable it to be fastened to the base plate 1 (see FIG. 5). The described procedure of stamping the lamella 56 by means of the follow-on tool is shown proceeding from left to right in FIG. 8.

The free space 71 resulting in the interior of the annular stator 6 encompasses, first, dynamo lamella stamping waste 72 (see FIG. 5), potted with plastic composition and forming an additional inertia mass and second, a bolt 73, in which the shaft 7 is centrally supported. A peg 74 is integrally formed onto the bolt 73 at the bottom, being fitted into the base plate 1; a screw 75 braces the bolt 73 firmly to the base plate 1. On its upper end, the bolt 73 has a coaxial blind bore 75, in which the bearing bush 18 is seated, which supports the shaft 7 in a rotatable and limitedly axially movable manner. The reciprocating plate 3 is screwed onto the shaft 7 and firmly fastened with the nut 9.

Another version of a circular conveyor having a small reciprocating plate diameter is shown in FIG. 9. The stator 6 of each of the two oscillating armature motors and their armatures 3 are each layered in packet form from dynamo lamination elements 57 and 57, respectively, which similarly to the version shown in FIG. 8 are stamped out from one dynamo lamella 56. Identical elements are therefore identified by the same reference numerals and not described further here.

The stator lamination elements 57 are layered on the webs 59 separate from one another and with their long sides abutting one another to make the two laminated stator packets of the two oscillating armature motors. The stator lamination elements 57 of the two laminated stator packets are placed on one another rotated by 180° from one another, so that the pole pieces 64 are located on both the right and left of the transverse axis shown at 76, so that their pole surfaces 85 are spaced equally apart from the transverse axis 76 and extend at right angles to the reciprocating plate, not shown. This embodiment assures a symmetrical drive with respect to the axis of rotation of the reciprocating plate.

In FIGS. 10-15, a vibrator conveyor system embodied as a linear conveyor is shown. The linear conveyor and the circular conveyor described are basically designed on the same principle. Elements corresponding to or identical with one another are therefore provided with identical reference numerals, for the sake of simplicity, while to distinguish those applying to the description of the linear conveyor, one or two zeros are simply added to the reference numeral used before.

The linear conveyor has an elongated, flat, strip-like base plate 100, which is either anchored in stationary fashion on the floor or is braced with respect to the floor via rubber/metal feet or vibration mounts, not otherwise shown but similar to those shown at 2 in FIG. 1. Extending at a distance above the base plate 100 and oriented parallel to it, a reciprocating plate 300 of similar cross section and likewise strip-like in shape is provided, which is braced elastically against the base plate 100 via spring elements 410. The spring elements 410 are embodied identically to the spring elements 41 of FIGS. 1, 4: they are bent substantially in the shape of a Z from a cylindrical spring wire and at the end have two rectangularly bent angle portions 420, which are joined to one another by a straight portion 420a. The reciprocating plate 300 may have an elongated conveyor groove, not shown in further detail.

The elongated spring elements 410 are distributed at equal intervals on the base plate 100 and reciprocating plate 300 in the vicinity of the lateral long edge thereof, and are connected to the base plate 100 and the reciprocating plate 300. Their straight portions 420a have the same inclination with respect to a horizontal plane, containing the primary advancement vector that in FIG. 11 is oriented horizontally from left to right, which is aligned in parallel with the reciprocating plate 300. In the position of repose (FIG. 11), the straight portions 420a of all the spring elements 410 form an angle with the reciprocating plate 300 and hence with the aforementioned horizontal plane that is less than 90° (for example, 75-78°). For fastening the spring elements 410 to the base plate 100 and reciprocating plate 300, these two plates are provided on the rim with slits 400 matching the spacing of the spring elements 410, and the spring elements 410 are introduced with their angle portions 420 into these slits, terminating in a respective peripheral milled recess 380 or 390. Clamping strips 440, 450 introduced into the milled recesses 380, 390 and screwed by means of countersunk screws 460 (FIG. 11) to the base or reciprocating plate 100 or 300, effect a firm fastening of the angle portions 420, as has already been explained in principle in conjunction with FIGS. 1, 3.

A stator 600 common to two oscillating armature motors is accommodated in the space defined by the spring elements 410 arranged on the periphery of the base plate and reciprocating plate 100 and 300, respectively, being screwed to the base plate 100. Its basic structure is shown in particular in FIGS. 13 and 15:

The elongated armature 600, defined by parallel flanks and having a rectangular cross section, is formed from segments of the dynamo lamella 56 shown in FIG. 8, which are stacked to make a laminated stator packet. Openings 6000 of rectangular cross section are stamped out at regular intervals, oriented symmetrically with respect to the longitudinal center line, and they are defined on opposed sides by parallel sides extending parallel to the long edges of the laminated stator packet. Once again, a cut-away pole piece 640, which has the stator pole surface 80 and is defined on both sides by slits 620, protrudes into each of the openings 6000, while indentations 650 are left free on the top and bottom of the pole piece, serving to receive to winding heads of the excitation coils 500 slipped onto the pole pieces 640 (see FIG. 13).

The dimensions of the openings 6000 in the longitudinal direction of the stator 600 are selected such that one completely wound and insulated excitation coil 500 at a time can be introduced into the opening 6000 and from there slipped onto the pole piece 640, on which it is then fixed in a positionally firm manner by means of a synthetic resin impregnation, or the like.

The dynamo lamination elements forming the common stator 600 may be stamped out of the dynamo lamella 56 with the same follow-on tool with which the laminations intended for the stator 6 of the circular conveyor (FIG. 7) were stamped. Essentially, the tool parts that produce the recesses 58 of FIG. 8 are simply made inoperative. The holes 700 serve to receive screws, not otherwise shown, which similarly to the cylindrical screws 20 of FIG. 5 compress the laminated stator packet and fix it positionally correctly on the base plate 100.

An armature 400 secured to the reciprocating plate 300 protrodes into each of the rectangular openings 6000 of common stator 600, the armature being formed by a substantially block-shaped laminated armature packet layered from rectangular pieces of dynamo lamella. The rectangular armature lamination elements 670 (see FIG. 12) forming such a laminated armature packet are produced, like the armature lamination elements 67, in the manner shown in FIG. 8 from the dynamo lamella material stamped out of the openings 6000. The laminated armature packets made from them are screwed firmly to the reciprocating plate 300 by means of continuous cylindrical screws, similarly to what is shown in FIG. 5. They are limitedly movable in the openings 600. The associated air gap is indicated at 690 in FIGS. 12, 13.

In principle, the function of the linear conveyor described is the same as for the circular conveyor described earlier:

In the position of repose, that is, with the excitation coils 500 not excited, the spring elements 410 assume the position shown in FIG. 11, in which their straight portions 420a form an acute angle with the horizontal. If the excitation coils 500 supplied with alternating current or pulsating direct current are excited, then they attract the armatures 400 of the two oscillating armature motors horizontally, causing the spring elements 410 to be inclined more steeply, by approximately 2 to 3%, with their straight portions 420a. In the position of repose the air gap in the stator pole surfaces 80 is approximately 2.4 mm, for example, and approximately 0.4 mm in the excited state, which corresponds to an oscillating amplitude of approximately 2 mm. The result is that the vibrator conveyor system operates in a mode having a pronounced "throwing effect". From this position, the spring elements 410 return to the position of repose of FIG. 11, under the influence of their intrinsic elasticity, as soon as the excitation of the excitation coils 500 becomes zero.

As a result, both an up-and-down oscillating movement and a back-and-forth oscillating movement at right angles thereto (that is, horizontally) is imparted to the reciprocating plate 300, which may for example be used for conveying bulk goods in a container, not otherwise shown, located on the reciprocating plate 300.

Alternatively, the spring elements 410 may also be arranged in the manner shown on FIG. 10, such that in the position of repose they extend oriented approximately at right angles to the horizontal with the straight portions 420a. Upon excitation of the excitation coils 500, they are inclined somewhat in one direction and thereby biased. By their intrinsic elasticity, they return to the outset position of FIG. 10 as soon as the excitation disappears. A vibrator conveyor system designed in this way operates emphatically in a mode perhaps best described as an effect of the kind when a tablecloth is suddenly pulled out from under dishes on a table.

The length of the vibrator conveyor system is intrinsically as little limited as the number of oscillating armature motors accommodated in a suitably long common stator 600. Embodiments are also conceivable in which instead of a common laminated stator packet 600, each opening 6000, that is, each oscillating armature motor, has its own associated corresponding laminated stator packet.

The spring elements 41 or 410 on the base plate 1 or 100 and the reciprocating plate 3 or 300 can be embodied and fastened in various ways. The exemplary embodiments described in conjunction with FIGs. 1, 3 and 10, 11 impose no limitation in this respect.

Figure 16:
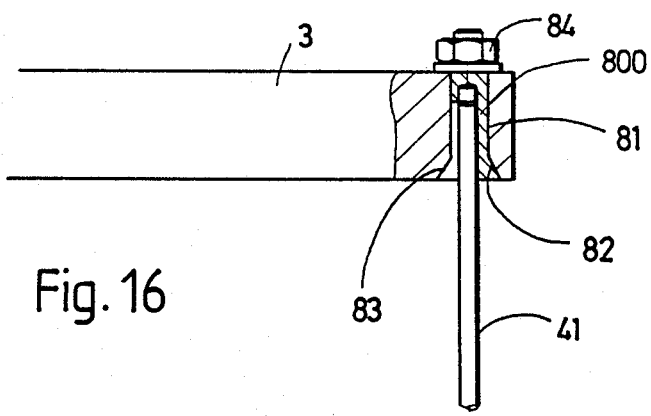

FIG. 16, for instance, shows an embodiment in which the spring elements 41 (or 410) are modified such that the horizontal part of each of its angle portions 42 is left out. On the remaining vertical, cylindrical portion, a clamping sleeve 800 is installed, which is inserted into a corresponding cylindrical bore 81, for instance in the reciprocating plate 3. The clamping sleeve 800, longitudinally slit in a known manner in the vicinity of its bore, has a conical circumferential surface 82 on its end, which cooperates with a corresponding conical surface inside the bore 81, such that when a clamping screw 84 of the clamping sleeve 800 is tightened, the cylindrical spring element 41 is radially raised.

Figure 17:
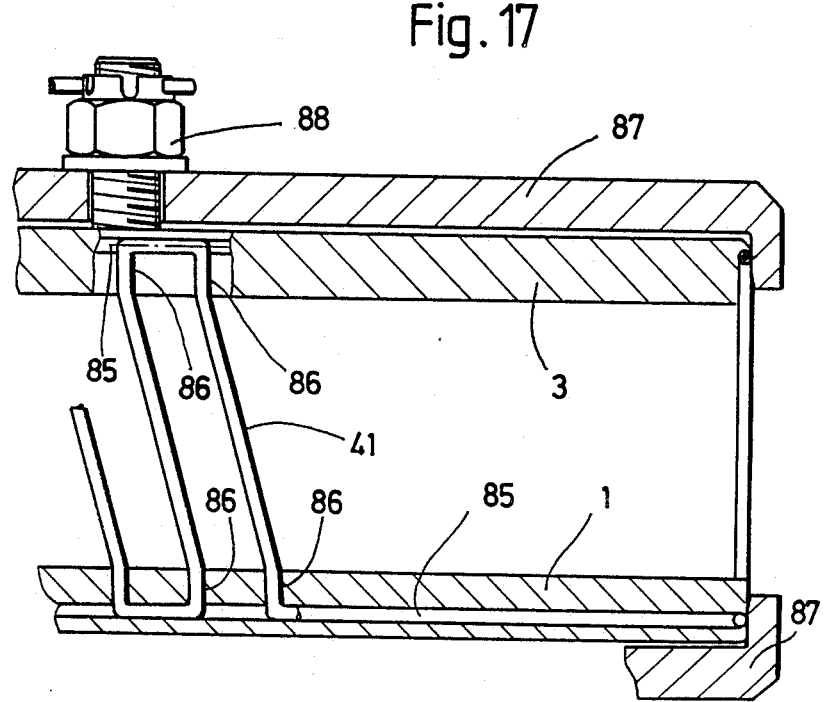
Figure 18:
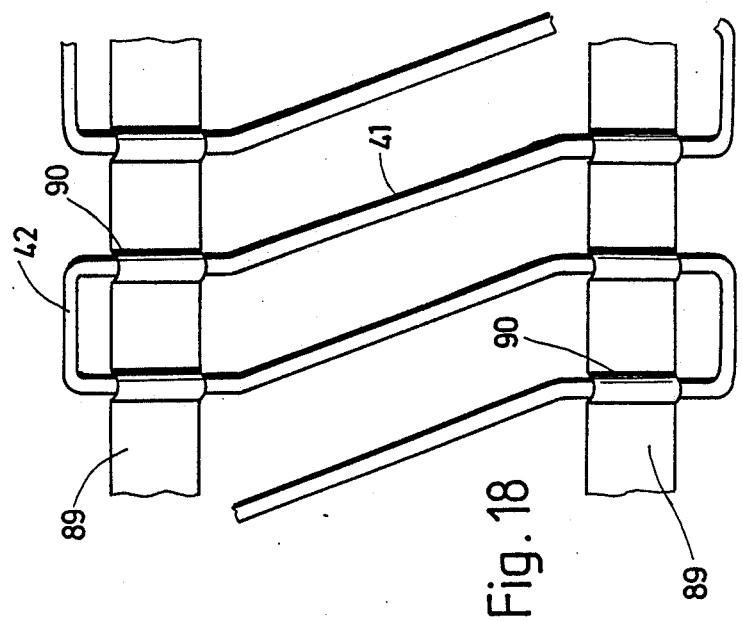

In the exemplary embodiments shown in FIGS. 17, 18, each of the spring elements 41 or 410, which are substantially Z-shaped, as in FIGS. 1 and 11, is formed by a piece of suitably bent meandering, or crenelated structure of cylindrical spring wire, so that all the spring elements 41, or at least a group of such spring elements, are formed as a coherent unit with parallel leg portions, two of which, together, define a general U shape. The fastening of the grid-like mesh structure containing the spring elements 41 to the base plate 1 and reciprocating plate 3 (or 100, 300, respectively) can be done in such a way that the two plates 1, 3 each have a peripheral groove 85, from which rectangular slits 86 open at the edge extend, these slits receiving the corresponding parts of the mesh structure in the manner shown in FIG. 17. Clamping shells 87 fitting over the base plate 1 and the reciprocating plate 3 in the manner of a cap assure secure retention of the mesh structure on the base plate 1 and reciprocating plate 3. The clamping shells 87 can be braced against the two plates 1, 3 via axial screw means 88, for example.

A still simpler kind of fastening is shown in FIG. 18. Here the meandering mesh structure containing the spring elements 41 is secured by means of sheet-metal bands 89 mounted laterally on the base plate 1 and reciprocating plate 3, which have beads that in shackle-like fashion encompass the vertical legs of the angle portions 42. The sheet-metal bands 89 are secured by means of screw bolts, not further shown. Intrinsically, this embodiment is equally suitable for linear conveyors.

A similar type of fastening is shown in FIGS. 19, 20. The spring elements 41a, in this case formed by straight cylindrical spring wire segments located on an incline, are secured to the periphery of the base plate 1 and of the reciprocating plate 3 by means of sheet-metal bands 91, which have tabs 92 formed by cutting away of material and suitably bent in eyelet fashion, which encompass the spring elements 41a and are clamped to them. This embodiment is again readily usable in a linear conveyor.

Figure 21:
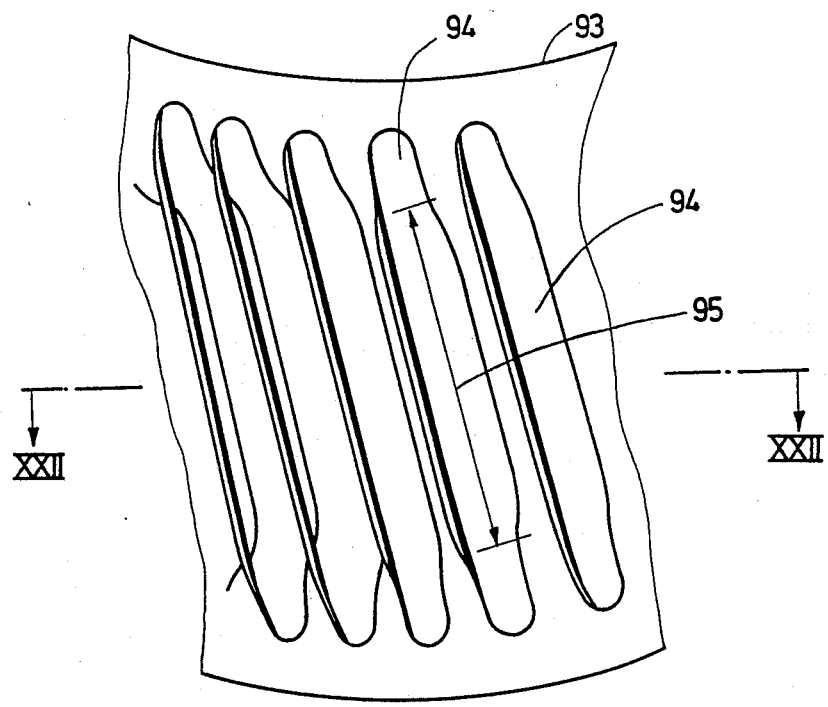
Figure 22:
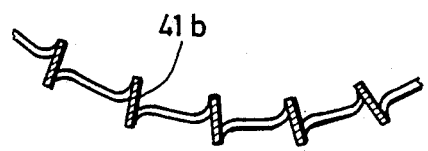

Finally, FIGS. 21, 22 also show a particularly simple embodiment in which the spring elements are embodied not by cylindrical, suitably bent spring wire segments, but by narrow webs 41b, which are formed on a spring metal strip 93 connecting the base plate 1 (or 100) and the reciprocating plate 3 (or 300) to one another directly. The spring metal strip 93, lying flat and defined by parallel sides is formed with elongated stamped-out recesses 94 located obliquely with the same inclination, and identically embodied and disposed at equal intervals. Between two adjacent elongated stamped recesses 94, a web forming a spring element 41b is defined. Over a longitudinal segment, shown at 95 in FIG. 21, this web is twisted by 90° with respect to the plane of the lamella, resulting in the cross-sectional shape in this region shown in FIG. 22.

The angle of twist in the longitudinal region 95 can also deviate from 90°; it may also vary over the length of the segment, and it is also conceivable for the stamped recesses 94 to be such on their periphery that they produce webs the dimensions of which vary in a predetermined manner over their length.

This embodiment, once again, is suitable for linear conveyors.

If the spring elements 41b are embodied in the manner described as cut-away webs of a sheet-metal strip 93, or if sheet-metal bands 89, 91 are used for fastening the spring elements 41 as shown in FIGS. 18, 19, then it is appropriate for these sheet-metal bands 89, 91, 93 to be used directly as fastening means for a sealing sleeve 96 sealing off the electromagnetic guard means. This sleeve 96, as FIG. 23 shows, is located in a peripheral recess 97 of the reciprocating plate 3 or of the base plate 1, and is fastened firmly to the respective associated plate by means of the sheet-metal band 93.

In the exemplary embodiments of both the circular and the linear conveyor systems, the pole surfaces 80 of the individual oscillating armature motors are oriented at right angles to the reciprocating plate 3 or 300, or in other words to the horizontal plane containing the primary conveyance direction. In principle, however, embodiments are also conceivable in which the pole surface 80 form an angle with this plane that is less than or equal to 90°, so that a vertical component of the drive force also comes into effect on the opposite armature pole surfaces.

The circular conveyor can be arranged selectively for clockwise or counterclockwise operation, using the same elements as described.

Various changes and modifications may be made, and features described in connection with any one of the embodiments may be used with any of the others, within the scope of the inventive concept.

We claim:

1. Vibrator conveyor system, comprising
an oscillating plate (3, 300) defining a rim and being adapted for carrying a container (11) for conveying articles in a path;
electromagnetic drive means, including at least two oscillating armature motors, for oscillating said plate along the conveying path; each motor having a stator (6, 600), an armature (4, 400) secured to said plate (3, 300) for oscillating said plate, and an excitation coil (5) driven by alternating current or pulsating direct current, said coil (5) being disposed on a pole piece of said motor, said pole piece having a stator pole surface (80) cooperating with an armature pole surface;
a plurality of spring elements (41) elastically supporting said plate (3, 300) for limited motion;
and support means (1) support said stator (6, 600), and forming part of an inertia support mass for said system,
wherein, in accordance with the invention,
said spring elements (41, 410) are elongated elements located, aligned, along at least a portion of the rim of said plate (3, 300),
said spring elements being inclined with equal inclination with respect to each other, and coupled to said plate (3, 300);
wherein the armature (4, 400) and stator (6, 600) of said at least two of said oscillating armature motors are each laminated of dynamo lamellae and form a laminated pocket,
said at least two motors are located in a space surrounded by said spring elements (41, 410),
the stator pole surfaces (80) of said at least two motors are positioned in planes extending from said plates at the same angle;
the laminated stator packet of each motor is formed with at least one opening (22, 60, 600) defining, on one side, at least in part, at least one of said stator pole surfaces, and
wherein the armature (4,400) of the respective motor is located in said opening and has said armature pole surface oriented towards said stator pole surface (80), said armature being dimensioned relative to said opening to permit limited movement of the armature in said opening, with play (35, 93, 930).

2. Vibrator conveyor system according to claim 1, wherein the stator pole surfaces (80) are located extending at right angles to said plate (3, 300).

3. Vibrator conveyor system according to claim 1, wherein at least one of said stator (6,600) and said armature (4, 400) of said at least two oscillating armature motors is common to both said oscillating motors.

4. Vibrator conveyor system according to claim 1, wherein said pole pieces (64, 640) are formed by slotting away of the laminated stator packet.

5. Vibrator conveyor system according to claim 1, wherein said pole piece (30, 64, 640) having said respective stator pole surface (80) and adjoining said opening (22, 60, 600) is defined on two opposed sides by two slots (29, 39, 390) leading into said opening and in which said excitation coils (5, 500) are received.

6. Vibrator conveyor system according to claim 5, wherein said pole piece (30, 64, 640) has a lesser height than said laminated stator packet, and indentations (65, 650) receiving portions of said excitation coil (5, 500) are formed between said pole piece and adjacent portions of said laminated stator packet.

7. Vibrator conveyor system according to claim 6, wherein said indentations (65, 650) have a height at least equal to the height of said portions of the excitation coils.

8. Vibrator conveyor system according to claim 1 wherein said opening (22, 60, 600) has an inside width exceeding the axial length of said excitation coil (5, 500), such that said excitation coil can be introduced into said opening and slipped from it onto said pole piece (30, 64, 640).

9. Vibrator conveyor system according to claim 1, wherein said opening and said armature (4, 400) have a substantially rectangular cross-sectional shape.

10. Vibrator conveyor system according to claim 1, wherein the conveyor is a circular conveyor; and
wherein said opening (22) has a substantially star-shaped form having arm-like elements (23) extending from it, within which said stator pole surfaces (80) are located.

11. Vibrator conveyor system according to claim 10, wherein said arm-like elements (23) of said opening (22) are defined on at least one side by flat faces (24, 26), on which said stator pole surfaces (80) are formed.

12. Vibrator conveyor system according to claim 1, wherein the conveyor is a circular conveyor; and
wherein said laminated stator packet is substantially annular.

13. Vibrator conveyor system according to claim 12, wherein said laminated stator packet is substantially cylindrical.

14. Vibrator conveyor system according to claim 1, comprising an additional inertial mass (50, 72) connected to said laminated stator packet.

15. Vibrator conveyor system according to claim 12, wherein said annular laminated stator packet is formed with an interior chamber (71); and
an additional inertia mass (71) is located in said chamber.

16. Vibrator conveyor system according to claim 15 wherein said inertia mass contains small mass elements cohered by a bonding agent, in particular stamping waste from dynamo lamellae.

17. Vibrator conveyor system according to claim 1, wherein said inertial support mass is predominantly formed by said laminator stator packet.

18. Vibrator conveyor system according to claim 1, wherein said conveyor is a circular conveyor; and
wherein bearing means (7, 19; 7, 73) are provided for supporting said plate (3) radially and axially movable with respect to said laminated stator packet.

19. Vibrator conveyor system according to claim 1, wherein said dynamo lamellae of said laminated stator packet are stamped out from a sheet-metal strip (56) defined on parallel sides, and said dynamo lamellae (67) of said laminated armature packet are formed from the sheet-metal parts stamped out from said openings (60, 600).

20. Vibrator conveyor system according to claim 18, wherein said wedge-shaped recesses (58) extending from one side end and located between adjacent openings (60, 600) are stamped out in said sheet-metal strips (56), and said strip (56) is bent in the plane of said strip about narrow webs (59) remaining at the bottom of said recesses (58), forming an annular stator (6).

21. Vibrator conveyor system according to claim 20, wherein said strip (56) is bent substantially in a spiral, forming individual layers, resting flat on one another, of said laminated stator packet.

22. Vibrator conveyor system according to claim 19, wherein said laminated stator packets (57) are substantially trapezoidal in shape.

23. Vibrator conveyor system according to claim 22, wherein two trapezoidal laminated stator packets are located with their long facing sides parallel to one another.

24. Vibrator conveyor system according to claim 22, wherein said trapezoidal laminated stator packets having short facing sides parallel to one another are located adjacent one another.

25. Vibrator conveyor system according to claim 23, wherein said two trapezoidal laminated stator packets are rotated by 180° with respect to one another.

26. Vibrator conveyor system, according to claim 1, wherein said spring elements (41, 410) are elongated spring wire elements, which are secured at one end on said plate (3, 300) and at the other end coupled to at least one of:
said laminated stator packet and
a base plate (1, 100) forming said supporting means.

27. Vibrator conveyor system according to claim 26, wherein said spring wire elements comprise a meander, or crenelated structure defining bent spring wire legs.

28. Vibrator covey or system according to claim 27, wherein said wire spring elements have a substantially S or Z shape.

29. Vibrator conveyor system according to claim 28, including clamping rings (44, 45; 440,450) secured on at least one of:
said reciprocating plate (3, 300) and
said base plate (1, 100),
by which said spring wire elements are secured.

30. Vibrator conveyor system according to claim 28, including shackle-like fastening means (92) secured on at least one of:
said reciprocating plate (3, 300) and
said base plate (1, 100),
by which said spring wire elements are secured.

31. Vibrator conveyor system according to claim 1, wherein said spring elements (41b) include narrow spring-elastic webs of a sheet-metal strip (93) having stamped-out slits (94), the material of said strip adjacent said slits (94) defining said webs, and said strip being secured on at least one of:
said reciprocating plate (3, 300),
said laminated stator packet, and
said base plate (1, 100).

32. Vibrator conveyor system according to claim 31, wherein said webs are wound about their longitudinal axis, in such a manner that they are located over a portion (95) of their length in planes that form a predetermined angle of less than 90° with the plane of said strip.

33. Vibrator conveyor system according to claim 1, including an elastic sleeve (96) secured on its periphery at least on said reciprocating plate (3, 300), said sleeve sealing off the space surrounded by said spring elements (41, 410).

34. Vibrator conveyor system according to claim 19, wherein said sheet metal strip (56) is formed with wedge-shaped recesses or cut-outs (58) extending from one side end and located between adjacent openings (60, 600).

35. Vibrator conveyor system according to claim 34, wherein the stator comprises two trapezoidal laminated stator packets, positioned parallel to one another with their longer parallel sides facing each other.

* * * * *